(12) United States Patent
Chis et al.

(10) Patent No.: US 12,007,755 B2
(45) Date of Patent: Jun. 11, 2024

(54) SYSTEMS AND METHODS FOR CONTROLLING COORDINATED DRIVE SYSTEMS

(71) Applicant: Rockwell Automation Technologies, Inc., Mayfield Heights, OH (US)

(72) Inventors: Marius G. Chis, Cambridge (CA); Jonathan A. Mills, Mayfield Heights, OH (US); Scott D. Braun, Menomonee Falls, WI (US); Todd A. Wiese, Hubertus, WI (US); David C. Mazur, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 58 days.

(21) Appl. No.: 17/447,647

(22) Filed: Sep. 14, 2021

(65) Prior Publication Data
US 2023/0080622 A1 Mar. 16, 2023

(51) Int. Cl.
*G05B 19/418* (2006.01)

(52) U.S. Cl.
CPC ..... *G05B 19/4185* (2013.01); *G05B 19/4183* (2013.01); *G05B 19/4188* (2013.01)

(58) Field of Classification Search
CPC ............ G05B 19/4185; G05B 19/4183; G05B 19/4188
See application file for complete search history.

(56) References Cited

U.S. PATENT DOCUMENTS

| | | | |
|---|---|---|---|
| 2009/0016475 A1* | 1/2009 | Rischar | H04J 3/0697 375/356 |
| 2010/0082814 A1 | 4/2010 | Plache et al. | |
| 2010/0299401 A1 | 11/2010 | Lloyd | |
| 2011/0052416 A1* | 3/2011 | Stiles | F04D 15/0066 417/42 |
| 2013/0131837 A1* | 5/2013 | Washington | F24F 13/068 700/12 |
| 2013/0131839 A1* | 5/2013 | Washington | G05B 15/02 700/19 |
| 2015/0012140 A1 | 1/2015 | Fang et al. | |
| 2017/0237288 A1 | 8/2017 | Weidman et al. | |
| 2018/0013619 A1* | 1/2018 | Albrecht | H04L 45/42 |
| 2018/0225244 A1* | 8/2018 | Dorneanu | G06F 13/374 |

OTHER PUBLICATIONS

European Patent Office, Partial European Search Report, Application No. 22193864.0, dated Jan. 25, 2023, 16 pages.
European Patent Office, Extended European Search Report, Application No. 22193864.0, dated Feb. 22, 2023, 14 pages.

* cited by examiner

*Primary Examiner* — Christopher E. Everett
(74) *Attorney, Agent, or Firm* — Quarles & Brady LLP (57) ABSTRACT

An industrial device includes an input/output module and a processor. The input/output module is configured to communicate with one or more other devices via an industrial network. The processor is configured to configure the industrial device as a leader device or a follower device. The processor includes a leader module, upon being activated, configured to detect and configured one or more follower devices connected to the industrial network; and a follower module, upon being activated, configured to broadcast identity and receive configuration command from a leader device.

18 Claims, 7 Drawing Sheets

SYSTEMS AND METHODS FOR CONTROLLING COORDINATED DRIVE SYSTEMS

FIELD OF THE DISCLOSURE

The disclosure relates generally to drive systems in the industrial automation field. More particularly, embodiments of the present disclosure are related to systems and methods for controlling coordinated industrial drive systems.

BACKGROUND OF THE DISCLOSURE

Many industrial processes and machines are controlled and/or powered by electric motors. Such processes and machines include pumps providing fluid transport for chemical and other processes, fans, conveyor systems, compressors, gear boxes, motion control devices, HVAC systems, screw pumps, and mixers, as well as hydraulic and pneumatic machines driven by motors. Such motors are combined with other system components, such as valves, pumps, furnaces, heaters, chillers, conveyor rollers, fans, compressors, gearboxes, and the like, as well as with appropriate power control devices such as motor starters and motor drives, to form industrial machines and actuators. For example, an electric motor may be combined with a motor drive providing variable electrical power to the motor, as well as with a pump, whereby the motor rotates the pump shaft to create a controllable pumping system.

The motorized pumping system can include cascaded pump systems that utilize multiple pumps to increase the pumping capacity and efficiency. Each of the multiple pumps is powered a corresponding electric motor. Each electric motor is controlled and powered by a corresponding drive. It is beneficial to provide a method and system for coordinating these drives to increase pumping efficiency and maximize the useful life of the pump system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Some embodiments of the present invention relate to an industrial device which includes an input/output module and a processor. The input/output module is configured to communicate with one or more other devices via an industrial network. The processor is configured to configure the industrial device as a leader device or a follower device. The processor includes a leader module, upon being activated, configured to detect and configure one or more follower devices connected to the industrial network; and a follower module, upon being activated, configured to broadcast identity and receive configuration command from a leader device.

Some embodiments of the present invention relate to an industrial system. The industrial system includes a plurality of industrial devices. Each of the plurality of industrial devices includes an input/output module and a processor. The input/output module is configured to communicate with one or more other devices via an industrial network. The processor is configured to configure the industrial device as a leader device or a follower device. The processor includes a leader module, upon being activated, configured to detect and configure one or more follower devices connected to the industrial network; and a follower module, upon being activated, configured to broadcast identity and receive configuration command from a leader device.

Some embodiments of the present invention relate to a method of determining a leader device within an industrial drive system. The method includes: generating a priority list of a plurality of devices, the priority list indicates the order of the plurality of devices being used as a leader device among the plurality of devices; determining a first leader device according to the priority list; detecting one or more changes of the plurality of devices; updating the priority list according to the detected one or more changes; and determining a second leader device according to the updated priority list.

Figure 1:
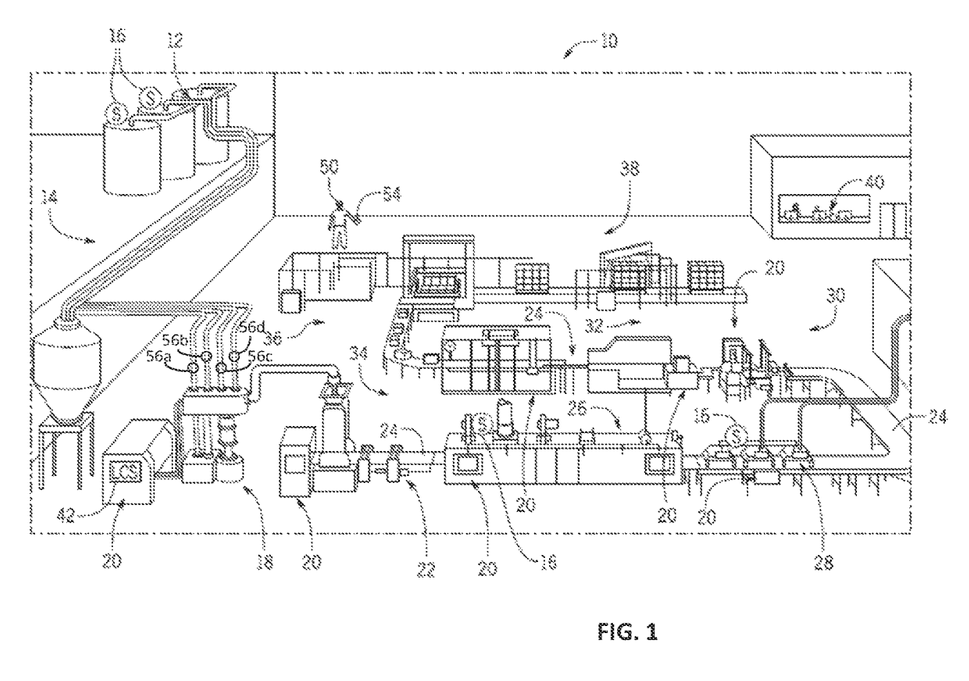
FIG. 1 shows a perspective view of an example industrial automation system employed by a food manufacturer.

By way of introduction, FIG. 1 is a perspective view of an example industrial automation system 10 employed by a food manufacturer. It should be noted that although the example industrial automation system 10 of FIG. 1 is directed at a food manufacturer, the present embodiments described herein may be employed within any suitable industry, such as water/waste water system, automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as water, grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18 through a pumping system 56 that include multiple pumps (e.g., 56a, 56b, 56c, 56d) to provide the raw materials. The pumping system 56 is powered by multiple electric motors that is further controlled and power by a coordinated drive system. The mixer 18 may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include or receive data regarding the operation of the respective industrial automation device 20, other industrial automation devices 20, user inputs, and other suitable inputs to control the operations of the respective industrial automation devices 20.

Figure 2:
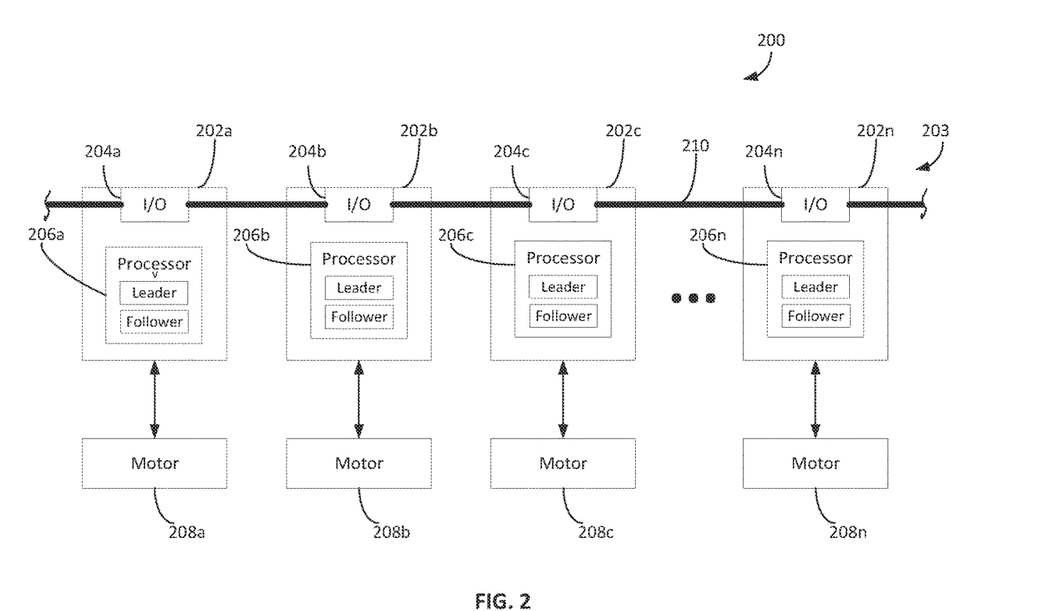
FIG. 2 shows a block diagram of a motorized industrial system according to an illustrative embodiment.

With reference to FIG. 2, a motorized industrial system 200 is shown according to an illustrative embodiment. The motorized industrial system 200 includes multiple motors 208 and a coordinated drive system 203. Each motor 208 is used to power and control a motorized equipment (e.g., pumps, compressors, fans, valves, etc.) The multiple motors 208 are controlled by the coordinated drive system 203. The coordinated drive system 203 includes multiple drive units 202. Each motor 208 (e.g., 208a) is controlled by a corresponding industrial drive unit 202 (e.g., 202a). When the motorized industrial system 200 receives a task request (e.g., a request for maintaining a desired fluid flow rate, outlet pressure, motor speed, torque, suction pressure, tank level, etc.), the drive system 203 coordinates the multiple drive units 202 to distribute the task among the multiple drive units 202. In some embodiments, the drive system 203 coordinates the multiple drive units 202 to operate in sequence to accomplish the requested task. In this way, the motorized industrial system 200 can maximize the drive capacity and maximize usage life of the motor-driven equipment powered by the motors 208.

In the drive system 203, the multiple drive units 202 communicate with each other through a communication channel 210. In some embodiments, the multiple drive units 202 may be connected through any suitable channels that enable communication between the drive units. In some embodiments, the communication channel 210 may be an Ethernet channel (e.g., a single pair Ethernet channel, four pair Ethernet channel) as described in the following FIG. 7. The multiple drive units 202 may include any suitable types of industrial drives (e.g., variable speed drives.)

The drive system 203 is configured with a leader drive unit and multiple follower drive units. The drive system 203 is configured to dynamically select a drive unit as the leader drive unit according to a leader priority list of all the drive units 202 within the drive system 203. For example, the leader priority list may include a ranking of priority indicating that the first drive unit on the list has the highest priority as a leader drive unit. Thus, the drive system 203 may select the first drive on the priority list as the leader drive unit. Once the first drive unit on the priority list fails or go offline (e.g., for maintenance purposes), the drive system 203 may select the next drive on the priority list as the leader drive unit. This dynamic selection of leader drive unit allows the first available drive unit with highest priority rank to act as the leader drive unit. Once the leader drive unit is determined, the rest of the drive units are configured as follower drive units. The leader drive unit is configured to detect all the follower drive units, assign an address to each detected follower drive unit, transmit configuration information to each follower drive unit, and acquire operating status information from each follower drive unit. The leader drive unit may be also configured to transmit operating status of the drive system 203 to an upper level control system (e.g., controllers, business logic, etc.)

When a drive unit is added to the drive system 203 or a drive unit becomes available, the leader drive unit is configured to detect the new drive unit, verify the detected new drive unit, and acquire status information of the new drive unit. Once the new drive unit is verified, the leader drive unit can acquire various control and operating status information from the new drive unit. The leader drive unit is further configured to update the priority list using the control and operating status information of the new drive unit. If the new drive unit is determined to have a higher leader priority compared to the current leader drive unit, the drive system 203 is configured to select the new drive unit as a new leader drive unit and reconfigure the current leader drive unit as a follower drive unit. In this way, the drive system 203 can select the leader drive unit according to a real-time updated priority list.

The leader drive unit is configured to send configuration data to each follower drive unit to control the operations of each drive unit. Upon receiving a task request from a controller for example, the leader drive unit is configured to distribute the task among the follower drive units based on the capacity of each follower drive units according to the received control and operating status information of each follower drive unit. In this way, the follower drive units can be coordinated to meet the task request with high efficiency and reliability, and low wear and tear on an individual motorized equipment. In some embodiments, the leader drive unit is configured to arrange the follower drive units to operate in a sequential manner to meet the requested task. For example, the leader drive unit may configure a first and a second follower drive units to operate and determine whether the requested task is accomplished. Upon determining that the requested task is not accomplished, the leader drive unit may configure a third follower drive unit to operate as well and determine whether requested task is accomplished. If not accomplished, similarly, the leader drive unit will configure more follower drive units until the requested task is accomplished.

In some embodiments, each drive unit 202 includes an I/O module 204 configured to communicate input and output data with adjacent drive units through the communication channel 210. Each drive unit 202 also includes a processor 206 including a leader module and a slave module. When a drive unit 202 is selected as a leader drive unit, the leader module is activated, and the follower module is deactivated. The activated leader module configures the drive unit 202 as the leader drive unit. When a drive unit 202 is determined as a follower drive unit, the leader module is deactivated, and the follower module is activated. The activated follower module configures the drive unit 202 as a follower drive unit. The leader module is configured with motorized equipment data (e.g., pump data of each pump) and a leader address. The leader module is further configured to detect other follower drive units within the same network. For example, the leader module may browse the network to acquire the follower drive units within the drive system 203 based upon a subnet range according to some embodiments. The leader module is further configured to receive the task request and determine a portion of the task for each follower drive unit based on the capacity of each drive unit. The leader module transmits the determined portion of the task to the corresponding follower drive unit and configure the follower drive unit to finish the assigned task. In some embodiments, the leader module may be configured to transmit the division of the task to each follower drive unit simultaneously. In some other embodiments, the leader module may be configured to transmit the division of the task to one or more selected follower drive units sequentially.

Figure 3:
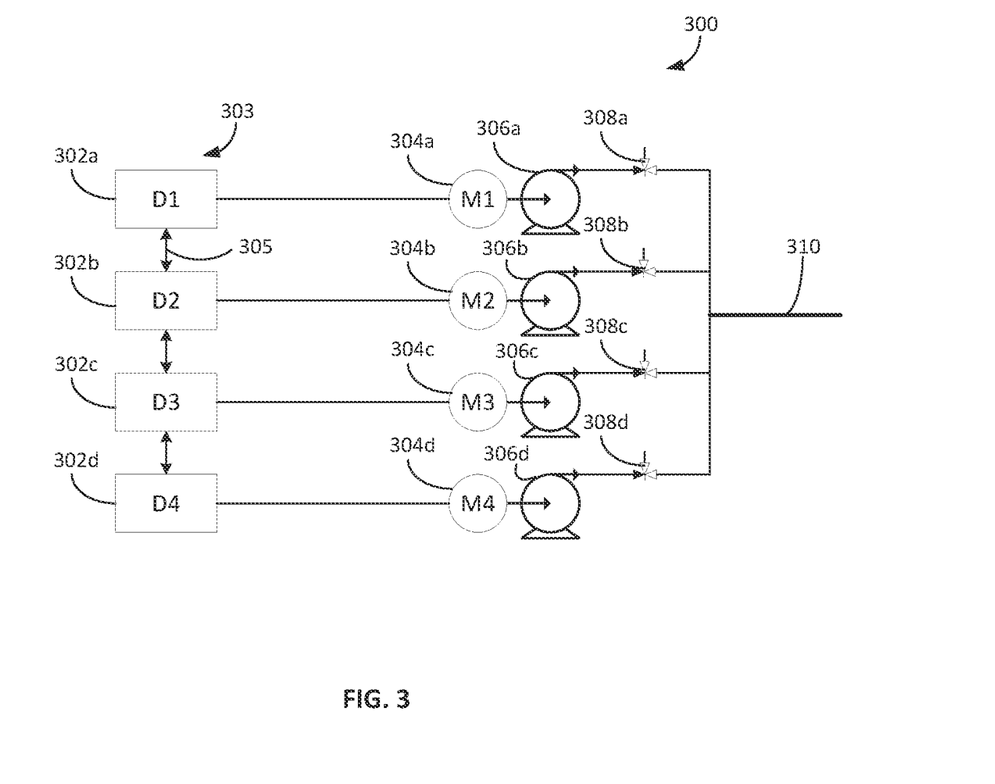
FIG. 3 shows a block diagram of a motorized industrial pump system according to an illustrative embodiment.

With reference to FIG. 3, a motorized industrial pump system 300 is shown according to an illustrative embodiment. The pump system 300 includes multiple pumps 306 for providing a desired outlet flow 310 (e.g., with a desired flow rate). Each pump 306 is operatively coupled with a motor 304 and a drive 302 providing electrical power to the motor. For example, the pump 306a is driven by the motor 304a which powered and controlled by the drive 302a. The drives 302 forms a drive system 303 that is configured to coordinate the drives through a leader and follower manner in order to optimize one or more performance characteristics of the pump system 300, such as life cycle cost, efficiency, life expectancy, safety, emissions, operations cost, MTBF, noise, and vibration. In some embodiments, the drive system 303 is similar to the drive system 203 as described in FIG. 2. The drives 302 are connected through a communication channel 305 that can be any suitable channels that enable the communication between the drives. For example, the communication channel 305 may be an Ethernet channel as described in FIG. 7.

The drive system 303 selects a drive (e.g., the drive 302b), among all the drives 302, as a leader drive. In some embodiments, the leader drive is selected based on a leader priority list of the drive system 303. The drive system 303 selects the drive that has the highest priority on the leader priority list as the leader drive. The leader drive is configured with pump data and a leader address. The leader drive 302b detects all the follower drives (e.g., drives 302a, 302c, and 302d) within the drive system 303. The leader drive may assign an address to each follower drive and verify whether each follower drive is valid and available. Once a follower drive is verified, the leader drive may acquire operating status from the follower drive. The operating status may include a pumping capacity of a corresponding pump.

When the drive system 303 receives a request for a desired pump outlet flow (e.g., a requested flow rate), the drive system 303 may utilize the leader drive as a coordinator to coordinate one or more follower drives to achieve the requested outlet flow. In some embodiments, upon receiving the requested outlet flow, the leader drive may configure one or more first drives to power the corresponding motors and pumps and determine whether the outlet flow meet the requested outlet flow. The outlet flow can be measured by one or more sensors and/or meters (e.g., flow rate meter) at the valves 308. Upon determining that the outlet flow does not meet the requested outlet flow and that one or more first drives reaches to a threshold operating limit, the leader drive may configure one or more second drives to power the corresponding motors and pumps and determine whether the outlet flow driven by the one or more first drives and second drives meets the request outlet flow. Similarly, the leader drive 302b may activate more drives sequentially until the requested outlet flow is achieved.

In some embodiments, upon receiving the requested outlet flow, the leader drive may acquire threshold capacity and operating characteristics of each drive and its corresponding motor and pump, and distribute the requested outlet flow among the drives within the drive system 303 according to the threshold capacity and operating characteristics of each drive-motor-pump combination. In this way, the leader drive and the follower drives may work simultaneously to achieve the requested outlet flow. For example, the leader drive 302b receives a request of a 2000 gallons per minute (GPM) outlet flow. The leader drive 302b may determine that the leader drive has a threshold capacity of 700 GPM, the follower drives 302a and 302c, each has a threshold capacity of 500 GPM, the follower drive 302d has a threshold capacity of 600 GPM. The leader drive may distribute 600 GPM of requested outlet flow to itself, 500 GPM to the follower drives 302a and 302c, and 400 GPM to the follower drive 302d. In this way, each drive is configured to operate to meet the distributed amount of flow rate so that the outlet flow meets the requested 2000 GPM. In some embodiments, when a follower drive and/or its corresponding motor and pump is under maintenance operations, the drive system 303 may reallocate the requested outlet flow among the remaining active drives. In some embodiments, when the leader drive is under maintenance operations or become inactive, the drive system 303 may update the leader priority list in real-time, so that another drive that has the highest priority in the updated leader priority list may be selected as a new leader drive. This dynamic leader-follower structure of the drive system increases efficiency of the pump system and allows even wear and tear among the pumps.

Figure 4:
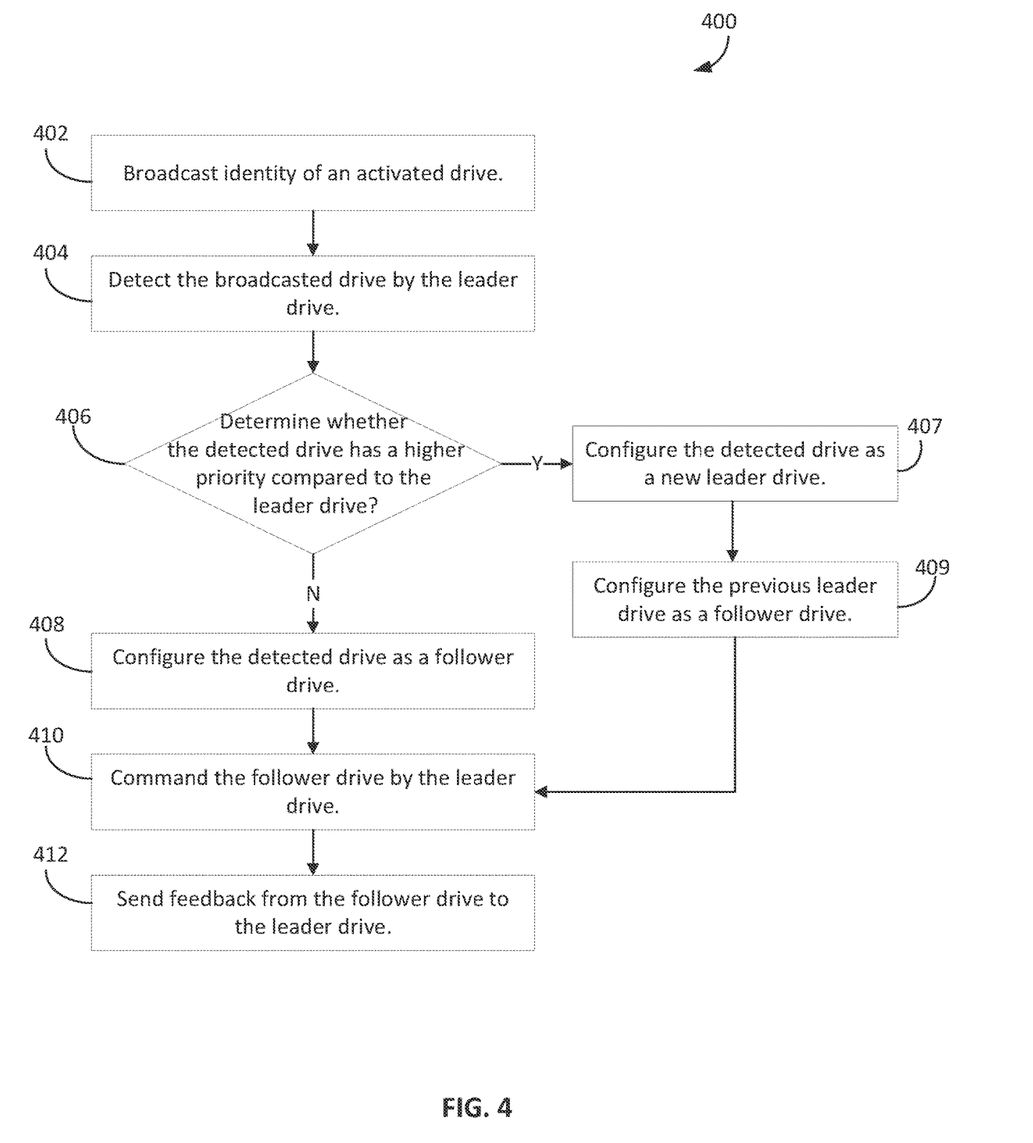
FIG. 4 shows a flow chart of a process of configuring a drive within a coordinated drive system according to some example embodiments.

FIG. 4 is a flow chart of a process 400 of configuring a drive within a coordinated drive system according to some example embodiments. The coordinated drive system may be similar as the drive system 203 and 303 as described above. The coordinated drive system utilizes a leader-follower structure to distribute requested task among the drives. The drive system selects a drive within the system as a leader drive according to a leader priority list of the all the drives. In some embodiments, the leader priority list may be associated with a capacity of each drive. For example, a drive that has higher capacity may have higher priority on the leader priority list.

At operation 402, when a drive is activated within the drive system, the drive is configured to broadcast its identity within the drive network.

At operation 404, the leader drive browses through the network and detects the broadcasted drive by receiving the broadcasted identity of the drive.

At operation 406, the leader drive determines whether the detected drive has a higher priority compared to the leader drive. The drive system updates the leader priority list in real-time such that when a new drive is detected, the new drive is ranked into the leader priority list. The leader drive may compare its priority to the detected drive's priority according to the updated leader priority list.

At operation 407, upon determining that the detected drive has a higher priority compared to the leader drive, the leader drive configures the detected drive as a new leader drive.

At operation 409, the new leader drive may configure the previous leader drive as a follower drive in some embodiments. In some other embodiments, the previous leader drive may configure itself as a follower drive after configuring the detected drive as a new leader drive.

At operation 408, upon determining that the detected drive has a lower priority compared to the leader drive, the leader drive configures the detected drive as a follower drive.

At operation 410, once the leader-follower structure is updated, such that a leader drive and a follower drive are determined by the above operations. The leader drive may command the follower drive to operate in a way to accomplish at least a part of a requested task.

At operation 412, the follower drive may send feedback to the leader drive. The feedback may include operating status and characteristics.

Figure 5:
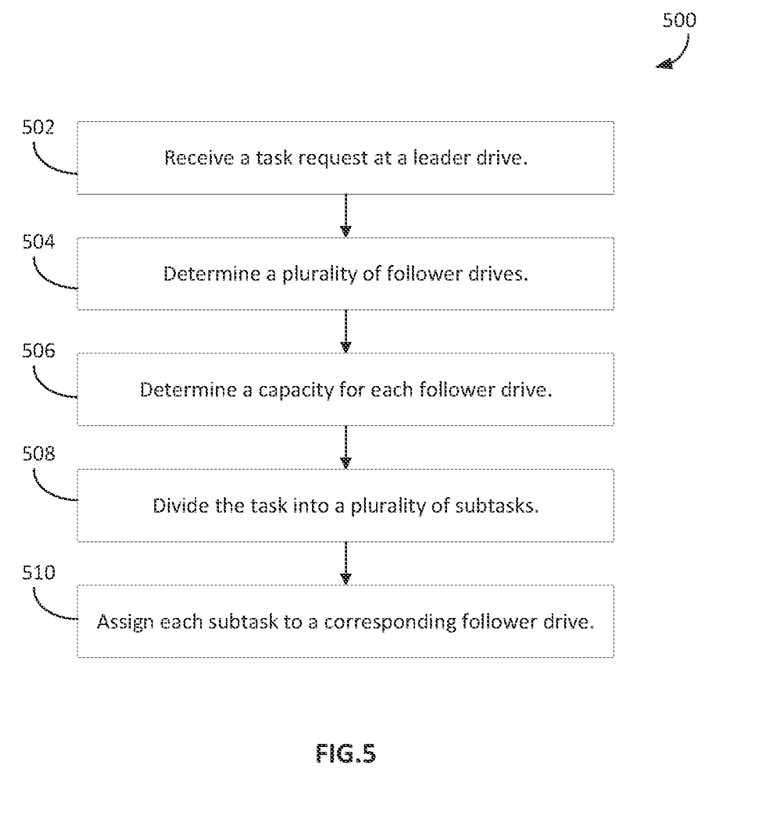
FIG. 5 shows a flow chart of a process of distributing a task within a coordinated drive system according to some example embodiments.

FIG. 5 is a flow chart of a process 500 of distributing a task within a coordinated drive system according to some example embodiments. The coordinated drive system may be similar as the drive system 203 and 303 as described above. The coordinated drive system includes a plurality of drives. The drive system utilizes a leader-follower structure to distribute requested task among the drives. The drive system selects a drive within the system as a leader drive according to a leader priority list of the all the drives. In some embodiments, the leader priority list may be associated with a capacity of each drive. For example, a drive that has higher capacity may has higher priority in the leader priority list. The leader drive configure all the other of the plurality of drives as follower drives.

At operation 502, the leader drive receives a task request. At operation 504, the leader drive detects and determines a plurality of follower drives by browsing the available drive within network. At operation 506, upon determining the follower drives, the leader drive determine a capacity for each follower drive by acquiring operating status and characteristics of each follower drive. At operation 508, the leader drive divide the task into a plurality of subtasks based on the capacity information of each follower drive. In some embodiments, the leader drive may determine each subtask to meet a desired percentage (e.g., 80%) of the capacity of a corresponding follower drive. At operation 510, the leader drive assigns each subtask to a corresponding follower drive so that the drive system may finish the requested task.

Figure 6:
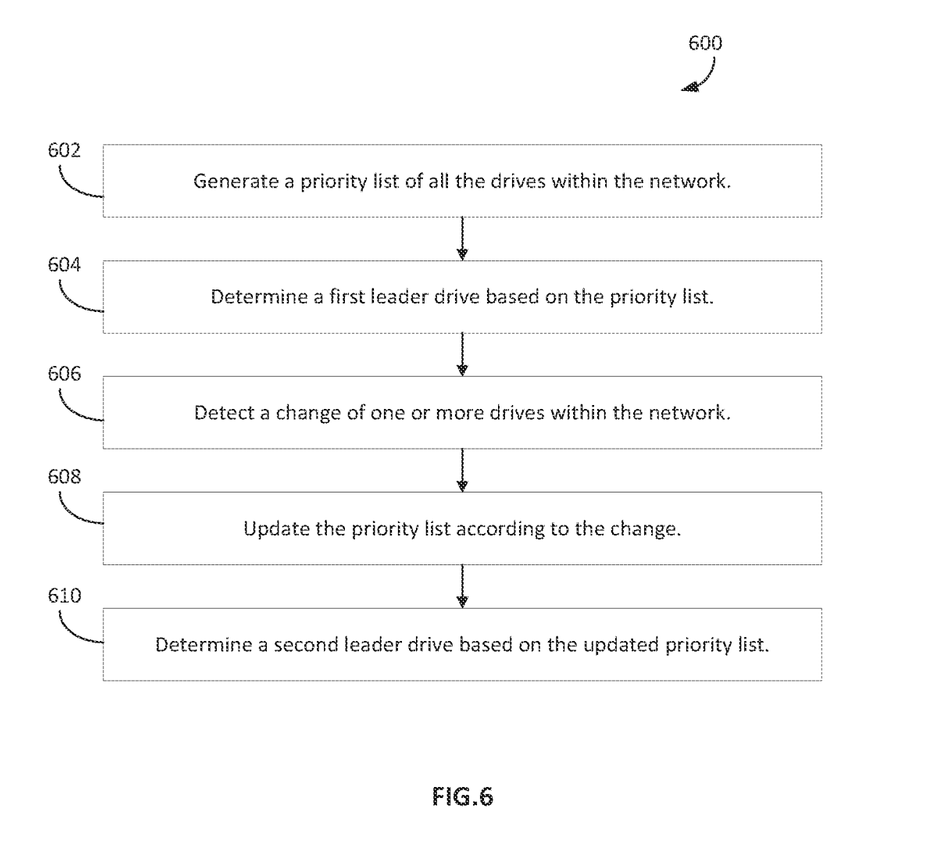
FIG. 6 shows a flow chart of a process of determining a leader drive within a coordinated drive system according to some example embodiments.

FIG. 6 is a flow chart of a process 600 of determining a leader drive within a coordinated drive system according to some example embodiments. The coordinated drive system may be similar as the drive system 203 and 303 as described above. The coordinated drive system includes a plurality of drives. The drive system utilizes a leader-follower structure to distribute requested task among the drives.

At operation 602, the drive system generate a priority list of all the drives within the network of the drive system. The priority list includes all the drives ranked based on their priority as being used a leader drive. In some embodiments, the priority may be ranked based on the capacity of each drive. For example, a drive that has higher capacity may have higher priority on the leader priority list. For example, a drive that has capacity that is closest to the required task have higher priority on the leader priority list. In some embodiments, priority may be ranked based on a combination of the capacity and life expectancy of the drive. The leader drive configure all the other of the plurality of drives as follower drives.

At operation 604, the drive system determines a first leader drive based on the priority list. In some embodiments, the drive system may select the first drive on the priority list that indicates a highest priority as the leader drive. In some embodiments, the drive system may select a specific drive within the priority list as the leader drive. For example, the drive system may select the third drive on the list as the leader drive because the first two drives do not meet certain requirements in a specific application.

At operation 606, the drive system constantly monitors all the drives within the system and detects any changes of one or more drives within the network in real-time. For example, a new drive is added to the drive system, or a drive is deactivated for maintenance purposes.

At operation 608, once a change of the drive system is detected, the drive system generates an updated priority list to accommodate the detected change. For example, positioning the newly added drive within the priority list or removing a deactivated drive from the priority list.

At operation 610, the drive system determines a second leader drive based on the updated priority list. In some embodiments, if the first leader drive remains the highest priority in the updated priority list, the second leader drive is same as the first leader drive. In some other embodiments, if the first leader drive is no longer on the top of the priority list, in other words, there is one or more other drives that have higher priority, the second leader drive may be the drive that has highest priority in the updated priority list.

Figure 7:
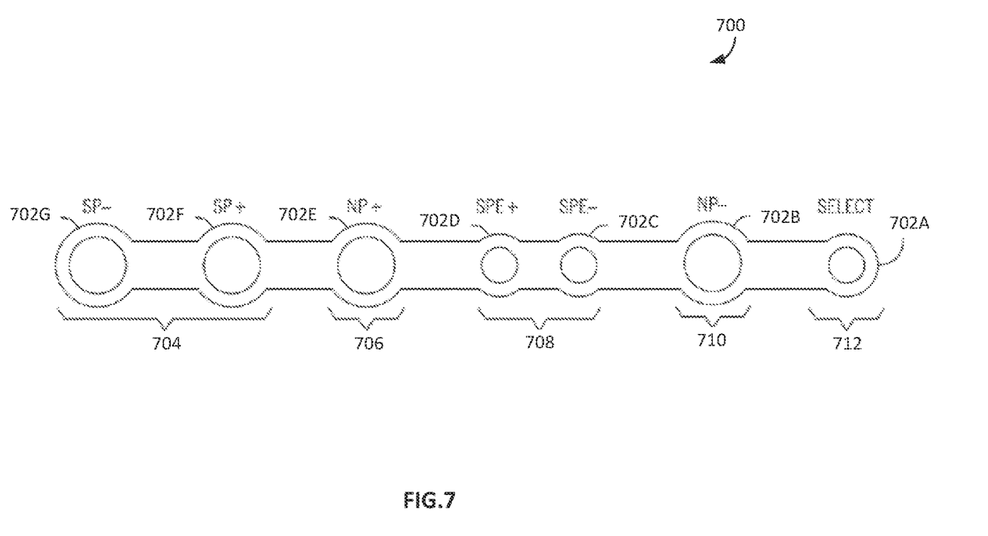
FIG. 7 is a cross-sectional view of a communication cable according to an illustrative embodiment.

FIG. 7 is a cross-sectional view of a communication cable 700 according to an illustrative embodiment. The communication cable 700 can be used as the communication channel 210 of FIG. 2 and the communication channel 305 of FIG. 3. The communication cable 700 may include single pair Ethernet (SPE) conductors 708, a switched power (SP) 704 pair, a pair of network power (NP) conductors 706 and 710, and a select line conductor 712. The SPE 708 may include a first and a second conductor to enable transmission of a differential signal. In certain embodiments, the SPE 708 may be a single pair Ethernet cable and the SP 704 and the NP 710 and 706 may carry Direct Current (DC) power. The SPE 708 conductors may transmit communication signals and the SP 704 conductors may transmit signals in the form of switched electrical power between different nodes. In some embodiments, the SPE 708 and/or the SP 704 may deliver electrical power to one or multiple drives to power actuators, contactors, and sounders, among other things. The NP 710 and NP 706 conductors may provide electrical power to one or multiple drives. In some embodiments, the NP 710 and NP 706 conductors may power the communication circuits and/or microcontrollers (e.g., processor) of the respective one or multiple drives. Furthermore, the select line conductor 712 may communicate a select line signal to facilitate identification and configuration of drives. The select line conductor 712 may transmit communication signals and/or facilitate communication or transmission of power signals by the SPE 708 conductors and/or the SP 704 conductors. For example, the select line conductor 712 may include identification numbers associated with selection of a drive on the communication cable 700. It should be noted that in different examples a selected drive by the select line conductor 712 may perform different functions associated with the selected drive.

The subject matter as described above includes various exemplary aspects. However, it should be appreciated that it is not possible to describe every conceivable component or methodology for purposes of describing these aspects. One of ordinary skill in the art can recognize that further combinations or permutations can be possible. Various methodologies or architectures can be employed to implement the various embodiments, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

As used in this disclosure, the terms "component," "system," "unit," "section," "controller," "terminal," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

What is claimed is:

1. A drive unit, comprising:
an input/output module configured to communicate with one or more other drive units via an industrial network; and
a processor configured to configure the drive unit as a leader device or a follower device, wherein the drive unit is configured for operation as the leader device and as the follower device, comprising:
  a leader module configured to detect and configure one or more follower devices connected to the industrial network, wherein when the leader module is activated, the drive unit operates as the leader device; and
  a follower module configured to broadcast an identity of the drive unit and receive a configuration command from one of the one or more other drive units operating as the leader device, wherein when the follower module is activated, the drive unit operates as the follower device, wherein the leader module is further configured to:
receive operating status information of the one or more follower devices,
receive a requested task, and
distribute the requested task among the drive unit and the one or more follower devices until the requested task is completed.

2. The drive unit of claim 1, wherein the drive unit is coupled to a motor and a motorized equipment.

3. The drive unit of claim 2, wherein the motorized equipment comprises a pump.

4. The drive unit of claim 1, wherein the processor is configured to configure the drive unit as a leader device or a follower device based at least in part on a priority list.

5. The drive unit of claim 4, wherein the processor is configured to configure the drive unit as a leader device when the drive unit has the highest priority according to the priority list.

6. The drive unit of claim 5, wherein the leader device is configured to assign an address and command to one or more follower devices.

7. The drive unit of claim 4, wherein the processor is configured to configure the drive unit as a follower device when the drive unit does not have the highest priority according to the priority list.

8. The drive unit of claim 7, wherein the follower device is configured to receive command from the leader device.

9. The drive unit of claim 1, wherein the industrial network is configured to enable communication through an Ethernet channel.

10. An industrial system, comprising:
a plurality of drive units;
each of the plurality of drive units comprising:
an input/output module configured to communicate with one or more other drive units of the plurality of drive units via an industrial network; and
a processor configured to set up the drive unit as a leader device or a follower device, wherein the drive unit is configured for operation as the leader device and as the follower device, comprising:
a leader module configured to detect and configure one or more follower devices connected to the industrial network, wherein when the leader module is activated, the drive unit operates as the leader device; and
a follower module configured to broadcast an identity of the drive unit and receive a configuration command from one of the one or more other drive unit operating as the leader device, wherein when the follower module is activated, the drive unit operates as the follower device,
wherein the leader module is further configured to:
receive operating status information of the one or more follower devices,
receive a requested task, and
distribute the requested task among the drive unit and the one or more follower devices until the requested task is completed.

11. The industrial system of claim 10, wherein at least one of the plurality of drive units is coupled to a motor and a motorized equipment.

12. The industrial system of claim 11, wherein the motorized equipment comprises a pump.

13. The industrial system of claim 10, wherein the plurality of drive units are ranked based on priority on a priority list.

14. The industrial system of claim 13, wherein the processor is configured to configure the drive unit as a leader device or a follower device based at least in part on the priority list.

15. The industrial system of claim 14, wherein each processor is configured to configure the corresponding drive unit as a leader device when the drive unit has the highest priority according to the priority list.

16. The industrial system of claim 15, wherein each processor is configured to configure the corresponding drive unit as a follower device when the drive unit does not have the highest priority according to the priority list.

17. The industrial system of claim 16, wherein the leader device is configured to update the priority list when there is a change of one or more of the plurality of drive units.

18. A method of operating an industrial drive system comprising a plurality of drive units, the method comprising:
generating a priority list of the plurality of drive units, the priority list indicating an order of the plurality of drive units being used as a leader device among the plurality of drive units;
determining a drive unit as a first leader device according to the priority list;
the first leader device:
activating a leader module configured to:
detect and configure one or more other drive units of the plurality of drive units as follower devices,
receive operating status information of the follower devices, receive a requested task, and
distribute the requested task among the first leader device and the follower devices until the requested task is completed; and
deactivating a follower module configured to receive a configuration command from a leader device;
detecting one or more changes of the plurality of drive units, including a new drive unit added to the industrial drive system;
updating the priority list according to the detected one or more changes;
determining the new drive unit as a second leader device according to the updated priority list; and
in response to determining the new drive unit as the second leader device, the first leader device deactivating the leader module and activating the follower module.

* * * * *